United States Patent
Xu et al.

(10) Patent No.: US 11,089,073 B2
(45) Date of Patent: Aug. 10, 2021

(54) METHOD AND DEVICE FOR SHARING MULTIMEDIA CONTENT

(71) Applicant: SAMSUNG ELECTRONICS CO., LTD., Suwon-si (KR)

(72) Inventors: Jianwei Xu, Beijing (CN); Chuantao Chen, Beijing (CN); Zhichun Shen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 15/735,416

(22) PCT Filed: May 23, 2016

(86) PCT No.: PCT/KR2016/005447
§ 371 (c)(1),
(2) Date: Dec. 11, 2017

(87) PCT Pub. No.: WO2016/200078
PCT Pub. Date: Dec. 15, 2016

(65) Prior Publication Data
US 2018/0167433 A1 Jun. 14, 2018

(30) Foreign Application Priority Data

Jun. 11, 2015 (CN) .......................... 201510317608.1
May 17, 2016 (KR) ......................... 10-2016-0060215

(51) Int. Cl.
*H04L 29/06* (2006.01)
*G06F 16/435* (2019.01)
(Continued)

(52) U.S. Cl.
CPC .......... *H04L 65/601* (2013.01); *G06F 16/435* (2019.01); *H04L 65/4084* (2013.01);
(Continued)

(58) Field of Classification Search
None
See application file for complete search history.

(56) References Cited

U.S. PATENT DOCUMENTS 9,396,212 B2 * 7/2016 Haberman ............. H04N 5/775
2008/0178230 A1 * 7/2008 Eyal ................... H04N 21/8153
725/86
(Continued)

FOREIGN PATENT DOCUMENTS

CN       102196008 A      9/2011
CN       103533051 A      1/2014
(Continued)

OTHER PUBLICATIONS

International Search Report and Written Opinion (PCT/ISA/210 and PCT/ISA/237), dated Aug. 25, 2016 by the International Searching Authority in counterpart International Application No. PCT/KR2016/005447.

(Continued)

*Primary Examiner* — Angela Nguyen
(74) *Attorney, Agent, or Firm* — Sughrue Mion, PLLC

(57) ABSTRACT

Provided are a method and an apparatus for transmitting and sharing multimedia content. A method in which a second client receives, from a server, multimedia content provided by the server to a first client, includes: receiving, from the first client, sharing information regarding at least one piece of the multimedia content, the at least one piece being selected to be shared from among pieces of the multimedia content received by the first client; generating request information of the multimedia content based on the sharing information; transmitting the request information to a server in which the multimedia content is stored; and receiving the multimedia content retrieved by the server based on the request information, wherein the multimedia content is (Continued)

provided together with feature information representing details of the multimedia content.

20 Claims, 13 Drawing Sheets

(51) Int. Cl.
    *H04N 21/81*     (2011.01)
    *H04N 21/472*    (2011.01)
    *H04N 21/845*    (2011.01)
    *H04N 21/63*     (2011.01)
    *H04N 21/647*    (2011.01)

(52) U.S. Cl.
    CPC ..... *H04N 21/47202* (2013.01); *H04N 21/632* (2013.01); *H04N 21/8133* (2013.01); *H04N 21/845* (2013.01); *H04N 21/647* (2013.01)

(56) References Cited

U.S. PATENT DOCUMENTS

| | | |
|---|---|---|
| 2010/0125882 A1 | 5/2010 | Athias |
| 2011/0026898 A1* | 2/2011 | Lussier ................ G11B 27/034 386/280 |
| 2011/0072467 A1 | 3/2011 | Lee et al. |
| 2013/0152128 A1* | 6/2013 | Tanna ................ H04N 21/4126 725/39 |
| 2013/0182128 A1 | 7/2013 | Amtrup et al. |
| 2014/0023071 A1 | 1/2014 | Park et al. |
| 2014/0108568 A1 | 4/2014 | Lee |
| 2014/0150014 A1* | 5/2014 | Aitken ............... H04N 21/2381 725/33 |
| 2016/0021148 A1* | 1/2016 | Ijaz ..................... H04L 65/1069 709/206 |

FOREIGN PATENT DOCUMENTS

| | | |
|---|---|---|
| CN | 104348899 A | 2/2015 |
| JP | 2010226521 A | 10/2010 |
| KR | 1020090095799 A | 9/2009 |
| KR | 1020100115058 A | 10/2010 |
| KR | 1020110032674 A | 3/2011 |
| KR | 1020140010813 A | 1/2014 |
| WO | 2005101189 A2 | 10/2005 |
| WO | 2012134150 A2 | 10/2012 |

OTHER PUBLICATIONS

Communication dated May 13, 2020, from the State Intellectual Property Office of People's Republic of China in counterpart Application No. 201510317608.1.

* cited by examiner

METHOD AND DEVICE FOR SHARING MULTIMEDIA CONTENT

TECHNICAL FIELD

The present disclosure generally relates to multimedia, and more particularly, to technology for quickly sharing multimedia content in a broadcast mode. The present disclosure relates in particular to a method and an apparatus for transmitting and sharing multimedia content.

BACKGROUND ART

There are two modes for sharing multimedia content, one of which is to share entire multimedia content. To enable such a mode, the multimedia content has to be discontinuous and have a limited size. The other mode is a partial sharing mode for sharing some pieces of multimedia content. In this case, in a broadcast mode, the partial sharing mode is used at all times when users share multimedia content. In other words, the users are only interested in part of the multimedia content and desire to share content through a specific method.

However, an existing broadcast television (TV) is unidirectional, having only a downstream pathway without an upstream pathway. Thus, users cannot share multimedia content in real time while watching or listening to the multimedia content on an existing broadcast network.

One existing broadcast technology is based on Internet Protocol (IP) technology. The implementation of the broadcast based on the IP technology is classified into two types: technology based on on-demand broadband and technology based on IP multicast/broadcast.

According to the technology based on on-demand broadband, a user on a client side obtains, from a server, parameters regarding a current broadcast, for example, a current broadcast progress, a broadcast channel, and authority to receive the broadcast. Then, the user requests the server for data streams corresponding to the obtained parameters. Therefore, although data streams being broadcast throughout a broadcast process do not exist, effects of broadcasting data streams may be achieved from the user's point of view.

According to the technology based on IP multicast/broadcast, the server transmits continuous data streams to a multicast address or a broadcast address. In this case, a client side joins a multicast group or broadcast group corresponding to multimedia content in order to receive multimedia content being broadcast.

The above-described technology based on the on-demand broadband and the IP multicast/broadcast are built on IP technology. The technology has downstream pathways for broadcasting, and the client side may transmit request information to a server through an upstream pathway. Thus, while watching or listening to multimedia content, a user may share the multimedia content with other users.

With regard to the technology based on on-demand broadband, it has been possible to share content in real time. In particular, while watching or listening to certain multimedia content, a user may record time information of content in which the user is interested, and may upload information relevant to the content to a server. In this case, the server may intercept original multimedia content, generate new multimedia content from the original multimedia content according to the uploaded information, generate a Uniform Resource Locator (URL) accessible to the new multimedia content, and provide the URL to other users. The above real-time sharing method has been used so far to broadcast multimedia content.

In such a sharing mode, if a user wants to share part of the multimedia content, the user has to send, to the server, parameters of the multimedia content, for example, a start point in time and an end point in time of the part of the multimedia content that the user wants to share with other users. Then, the server generates a URL indicating new multimedia content in order to generate the part of the multimedia content as new multimedia content and sends to the user a notification to share the new multimedia content. During these processes, an amount of content stored in the server increases. That is, URLs are generated corresponding to pieces of content to be shared, and a time taken by the server to proceed with one process and search for content increases such that higher capacity and higher performance of the server are required. However, in terms of actual content, since original multimedia content and newly-generated multimedia content are partially or entirely relevant to each other, numerous pieces of multimedia content repeatedly appear.

Due to an increase in a server processing time and a network interaction time, a sharer has difficulty in sharing content in real time.

In an existing on-demand sharing mode, multimedia content obtained by a client is included in a media stream. For example, multimedia content that users (including a sharer and a receiver) watch or listen to is included in a media stream. Thus, the users may intercept the multimedia content according to a point in time when the users want to share the multimedia content, but, like partially intercepting video, audio, and subtitles of a movie, the users may not intercept the multimedia content according to other elements or space in a segment. However, in most cases, since the user has an interest in only some pieces of the multimedia content instead of the entire multimedia content, integrative bundling may inconvenience the user.

Moreover, only content specified by the user may be shared, and thus, associated and recommended functions regarding the content may be lacking.

DETAILED DESCRIPTION OF THE INVENTION

Technical Problem

An embodiment of the present disclosure relates to a method of sharing multimedia content in real time while a user is watching or listening to the multimedia content. Another embodiment of the present disclosure relates to a method of sharing part of the multimedia content.

Technical Solution

A second client is configured to receive, from a server, multimedia content provided by the server to a first client, and the second client includes: a communication interface configured to: receive, from the first client, sharing information including information regarding at least one piece of the multimedia content which is selected to be shared, from among pieces of the multimedia content received by the first client; transmit request information of the multimedia content to the server in which the multimedia content is stored, the request information being generated based on the sharing information; and receive the multimedia content retrieved by the server based on the request information; and a processor configured to generate the request information of the multimedia content, wherein the multimedia content is provided together with feature information representing details of the multimedia content.

Advantageous Effects of the Invention

According to an embodiment, users may share multimedia content in real time and may selectively share content that the users have interests in. In addition, the users may receive content relevant to the shared multimedia content.

BEST MODE

Figure 1:
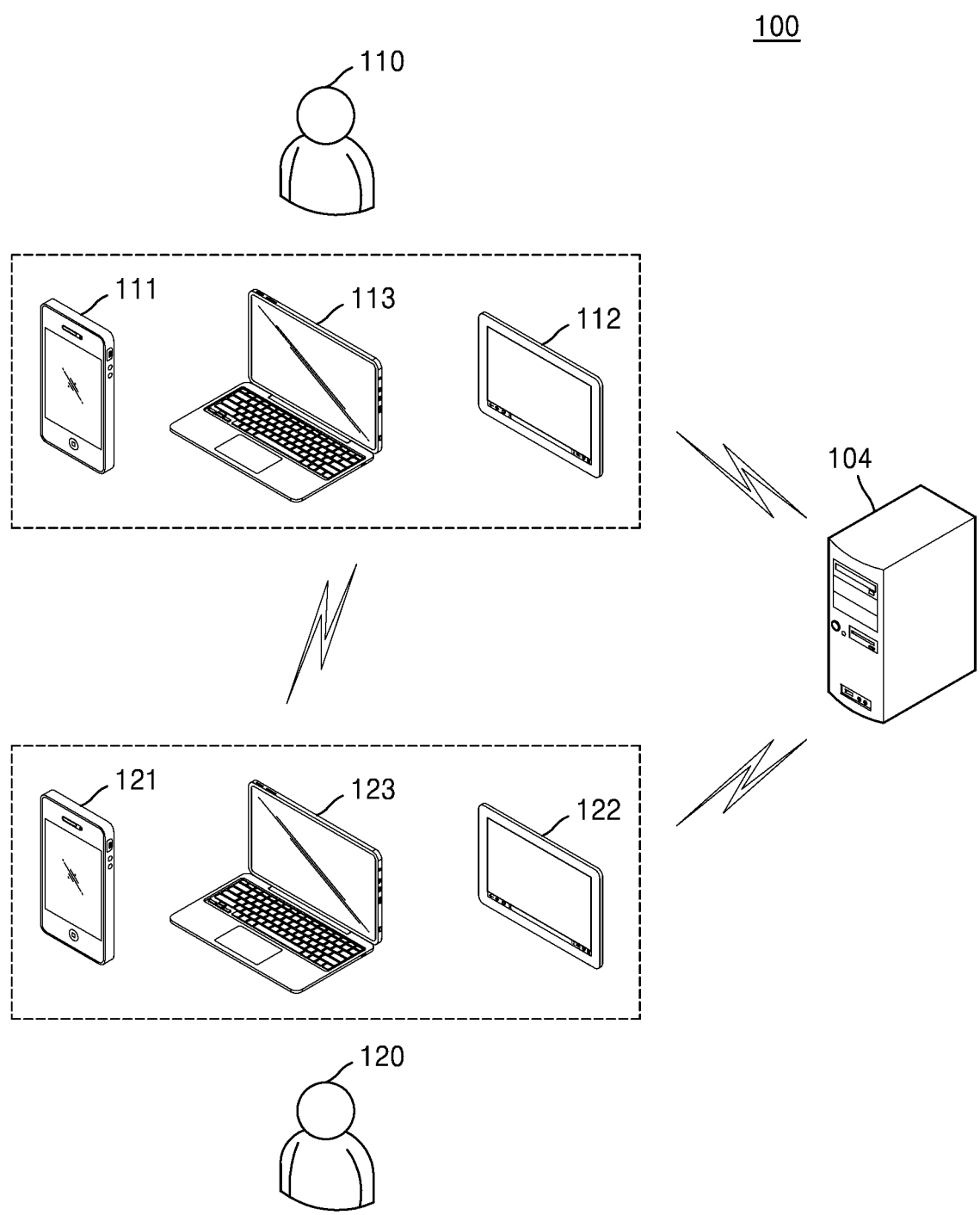
FIG. 1 is a diagram of a system architecture using an embodiment.

According to an embodiment, there is provided an apparatus including a second client, wherein the second client is configured to receive, from a server, multimedia content provided by the server to a first client, and the second client includes: a communication interface configured to: receive, from the first client, sharing information including information regarding at least one piece of the multimedia content which is selected to be shared, from among pieces of the multimedia content received by the first client; transmit request information of the multimedia content to the server in which the multimedia content is stored, the request information being generated based on the sharing information; and receive the multimedia content retrieved by the server based on the request information; and a processor configured to generate the request information of the multimedia content, wherein the multimedia content is provided together with feature information representing details of the multimedia content.

According to an embodiment, there is provided an apparatus including a first client, wherein the first client is configured to receive multimedia content from a server and shares the received multimedia content with a second client, and the first client includes: a communication interface configured to: select at least one piece of the multimedia content to share with the second client, the at least one piece being selected from among pieces of the multimedia content received from the server; and transmit, to the second client, sharing information including information regarding the at least one piece of the multimedia content; and a processor configured to generate sharing information of the multimedia content, wherein the multimedia content is provided together with feature information representing details of the multimedia content.

According to an embodiment, there is provided a method in which a second client receives, from a server, multimedia content provided by the server to a first client, the method including: receiving, from the first client, sharing information regarding at least one piece of the multimedia content, the at least one piece being selected to be shared from among pieces of the multimedia content received by the first client; generating request information of the multimedia content based on the sharing information; transmitting the request information to a server in which the multimedia content is stored; and receiving the multimedia content retrieved by the server based on the request information, wherein the multimedia content is provided together with feature information representing details of the multimedia content.

A non-transitory computer-readable recording medium having recorded thereon a program executed by a computer may record a method of editing text as a program executed by a computer.

MODE OF THE INVENTION

Hereinafter, embodiments of the present disclosure will be described in detail with reference to the accompanying drawings, in which embodiments of the disclosure are shown. The embodiments may be embodied in many different forms and should not be construed as being limited to the embodiments set forth herein. It will be understood that features that may be easily expected from the detailed description and embodiments by one of ordinary skill in the art are included in the scope of the present disclosure. In the drawings, parts irrelevant to the description are omitted to clearly describe the disclosure, and like reference numerals denote like elements throughout the specification.

In order to overcome limitations on existing technology for sharing multimedia content, a Moving Picture Experts Group (MPEG) media transport (MMT) protocol (ISO protocol No. ISO/IEC 23008-1) is suggested to provide a new multimedia transmission mode and enable multimedia broadcasting based on an Internet Protocol (IP). According to the MMT protocol, all pieces of multimedia content are split in a media processing unit (MPU) form and packed for transmission. Terminal presentation is controlled by a composition information (CI) entity (ISO protocol No. ISO/IEC 23008-11).

The CI entity (hereinafter, referred to as CI) is an extension of HTML 5, and a terminal presents multimedia content based on a browser. According to the MMT protocol, other pieces of multimedia content are respectively transmitted by different streams, typeset, rendered, and controlled based on the CI. Meanwhile, all types of CI transmission are performed in a signaling message mode. In this case, signaling messages may each include different table entries. The CI may be packed in a certain signaling message table entry at a server side. As a part of the signaling message, a table entry is transmitted to a client side together with the signaling message. The client side obtains the CI and other information such as a Network Time Protocol (NTP) by analyzing the signaling message, and proceeds with a subsequent process.

However, a design of the MMT protocol merely relates to IP broadcast and does not consider a method of sharing the multimedia content in real time while broadcasting the multimedia content.

FIG. 1 is a diagram of a system architecture 100 using an embodiment.

Referring to FIG. 1, the system architecture 100 may include a server 104, a sharing-transmission client 110, and a sharing-target client 120.

The sharing-transmission client 110 may include various terminals, for example, a mobile phone 111, a computer 113, and a tablet device 112.

In this case, a terminal is a device for receiving/transmitting information and providing a user with information through communication with an external device. The terminal may be, for example, a tablet device, a smart phone, a laptop, a camera, or the like, but is not limited thereto.

Similarly, the sharing-target client 120 may include various terminals, for example, a mobile phone 121, a computer 123, and a tablet device 122.

The server 104 may communicate with the terminals of the sharing-transmission client 110 and the terminals of the sharing-target client 120 in order to exchange data.

The terminals of the sharing-transmission client 110 may communicate with the terminals of the sharing-target client 120 in order to exchange data.

Figure 2:
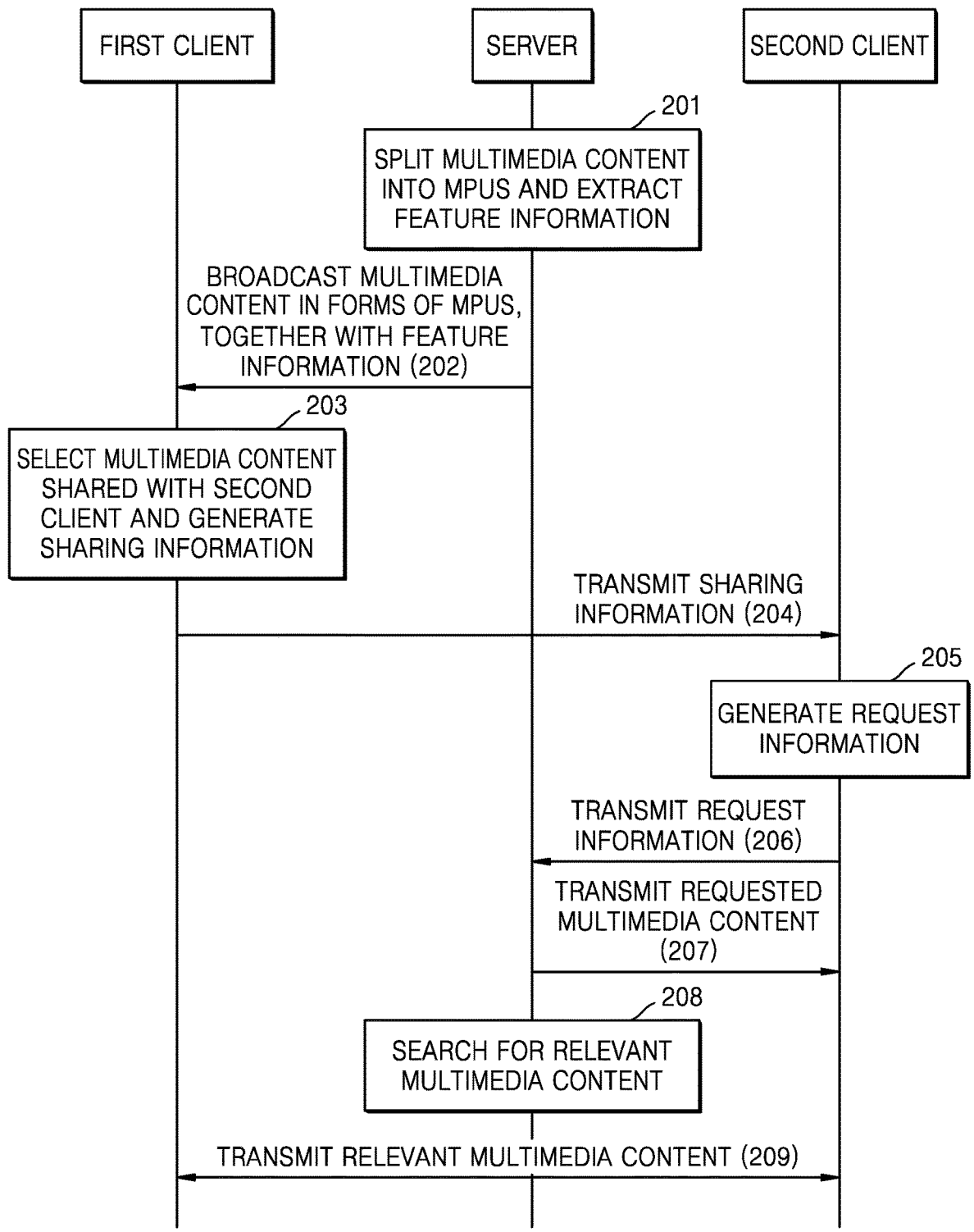
FIG. 2 is a diagram of an interaction process of sharing multimedia content, according to an embodiment.

FIG. 2 is a diagram of an interaction process of sharing the multimedia content, according to an embodiment.

The embodiment of FIG. 2 is to explain an interaction among one sharing-transmission client 110, one sharing-target client 120, and one server 104.

Hereinafter, the sharing-transmission client 110 of FIG. 1 corresponds to a first client of FIG. 2, and the sharing-target client 120 of FIG. 1 corresponds to a second client of FIG. 2.

Referring to FIG. 2, in operation 201, the server 104 may split the multimedia content into MPUs and may extract feature information of each MPU.

The server 104 is used to store the multimedia content. Also, the server 104 may obtain the multimedia content from an external device and may process the multimedia content. For example, the server 104 may split, combine, and delete the multimedia content and may extract feature information of the multimedia content. However, an operation in which the server 104 processes the multimedia content is not limited thereto.

The feature information of the MPU may represent content of the MPU and indicate some features of the MPU. For example, when the MPU is a video including natural scenery, the "natural scenery" may be one feature of the MPU.

In operation 202, the server 104 may split the multimedia content in units of the MPUs and may broadcast the multimedia content together with the feature information to the first client.

In operation 203, the first client may select the multimedia content that the first client desires to share with the second client, and may generate sharing information.

In particular, after receiving the multimedia content from the server 104, the first client may select some pieces of the multimedia content received from the server 104, as the multimedia content that the first client desires to share with the second client. Also, the first client may generate sharing information corresponding to the multimedia content that the first client desires to share with the second client in such a manner that the second client may obtain the multimedia content selected by the first client.

The sharing information may be information regarding pieces of the multimedia content which are to be shared. For example, the sharing information may include a start point in time and an end point in time when the first client desires to share the multimedia content with the second client, a type of the multimedia content to be shared, and the like. However, the sharing information is not limited thereto.

For example, when the first client desires to share pieces of the multimedia content in a certain period of time from among all pieces of the multimedia content obtained from the server 104, the sharing information may include information regarding time periods. Also, when the first client desires to share a certain space region of the multimedia content obtained from the server 104, the sharing information may include information corresponding to the space region.

In operation 204, the first client may transmit the sharing information with the second client.

In this case, the first client may transmit the sharing information to a certain second client.

Also, the first client may not specify the second client that receives the sharing information. In some embodiments, the first client may transmit a sharing message to a sharing platform, and the second client accessible to the sharing platform may determine whether to receive the sharing information.

In operation 205, the second client may generate request information. In order to obtain the multimedia content corresponding to the sharing information, the second client may receive the sharing information regarding the multimedia content from the first client and then may generate the request information corresponding to the sharing information.

In this case, a determination as to whether the second client is able to obtain the multimedia content that the first client selects to share with the second client may be made based on a user input to the second client.

The request information may be information regarding some pieces of the sharing information received by the second client from the first client. In particular, the request information may include location information of the multimedia content. In this case, a location does not indicate a spatial location, but may be defined as a different type of location including the spatial location as well as section information (a temporal location) specifying some pieces of the multimedia content.

In operation 206, the second client may transmit the request information regarding the multimedia content to the server 104.

Then, in operation 207, the server 104 may transmit requested multimedia content to the second client.

After receiving the request information from the second client, the server 104 may search for, based on the request information, the multimedia content that the first client selects to share with the second client, and may transmit found multimedia content to the second client.

In this case, since the first client generates the sharing information, but does not transmit the generated sharing information to the server 104, the server 104 does not generate new multimedia content and a Uniform Resource Locator (URL) indicating the new multimedia content, based on the sharing information. Thus, although the multimedia content is shared between the first and second clients, the server 104 does not additionally consume a storage space.

In addition, since the first client does not directly transmit the multimedia content that the first client desires to share with the second client, the multimedia content may be shared without a limitation on an exclusive storage space of the first client.

According to an embodiment, the server 104 may push, to the first and second clients, multimedia content relevant to the multimedia content that the first client selects to share with the second client.

In particular, in operation 208, the server 104 may search for other multimedia content relevant to the shared multimedia content.

When the first client transmits the sharing information to the second client, the sharing information may include feature information.

Thus, when the server 104 receives the request information from the second client, the server 104 may receive notification of the feature information of the multimedia content selected to be shared. The server 104 may search for multimedia content relevant to the selected multimedia content, based on the feature information.

In operation 209, the server 104 may transmit the relevant multimedia content to the first and second clients. The request information transmitted from the second client to the server 104 may include an address of the first client. Thus, when the server 104 finds information regarding the address of the first client from the request information, the server 104 may push the relevant multimedia content to the first client by referring to the address of the first client.

In addition, since the request information is transmitted from the second client to the server 104, the server 104 may obtain address information of the second client. Thus, the server 104 may push the relevant multimedia content to the second client.

Figure 3:
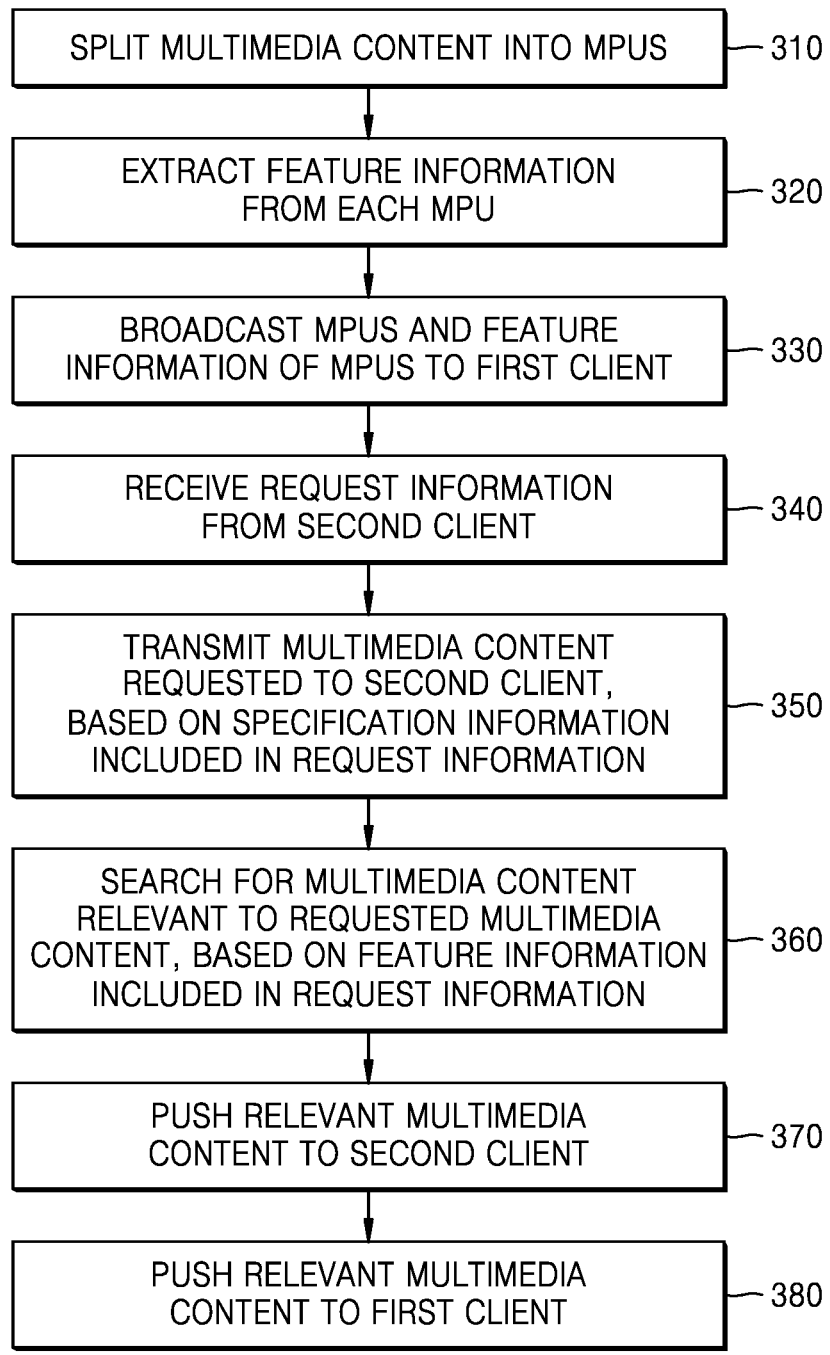
FIG. 3 is a flowchart of a method of transmitting multimedia content from a server, according to an embodiment.

FIG. 3 is a flowchart of a method of transmitting the multimedia content from the server 104, according to an embodiment.

In operation 310, the server 104 may split the multimedia content into multiple MPUs. The MPU may define a certain packing format for transmitting the multimedia content and may pack time-dependent media content and non-time dependent media content. The MPU may have an independent ISO based media file format (ISOBMFF) structure, may independently consume the multimedia content, and may hide details of encoding and decoding from a transmission function. Also, the MPU may include image frames, part of audio data, part of subtitle information, and/or the like.

In operation 320, the server 104 may extract the feature information from each MPU.

In this case, one MPU may correspond to one or more pieces of the feature information. The pieces of the feature information that respectively correspond to the MPUs may differ from each other and may partially overlap each other. The feature information corresponding to one MPU may be a subset of pieces of feature information corresponding to other MPUs.

In operation 330, the server 104 may broadcast the MPU and the feature information of the MPU to the first client.

A method of broadcasting the MPU and the feature information of the MPU to the first client may differ according to a communication protocol that complies with a broadcasting process.

Also, the MPUs of the multimedia content and the feature information corresponding to the MPUs may be broadcast to the first client. For example, when the multimedia content is split into six MPUs, that is, MPU1 to MPU6, pieces of the feature information corresponding to the MPU1 to MPU6 may be features 1 to 6, respectively.

The MPUs and the pieces of the feature information respectively corresponding to the MPUs may be transmitted in the following order.

Features 1 to 3: MPU1 to MPU3; features 4 to 6: MPU4 to MPU6

Features 1 to 3 and feature 4 to 6 are respectively analyzed, and duplicated pieces of the feature information may be removed. Also, Feature A including all pieces of the feature information from feature 1 to feature 3 and Feature B including all pieces of the feature information from feature 4 to feature 6 may be generated and may be transmitted in the following order.

Feature A, MPU1 MPU2, MPU3; Feature B, MPU4 MPU5, MPU6;

Feature A; MPU1 MPU2, MPU3; Feature B; MPU4 MPU5, MPU6.

Therefore, the MPUs and the pieces of the feature information corresponding to the MPUs may be broadcast to the first client through operations S310 to S330.

Figure 4:
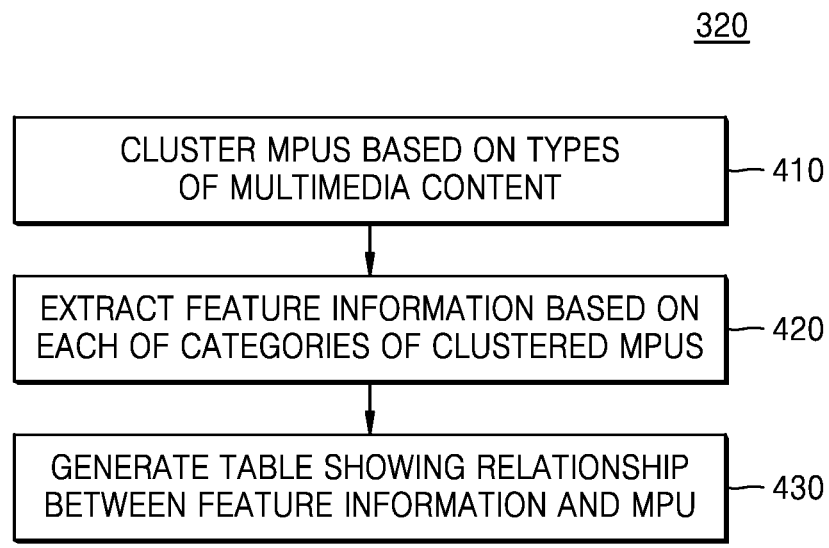
FIG. 4 is a flowchart of an operation in which feature information is extracted from each media processing unit (MPU), according to an embodiment.

FIG. 4 is a flowchart of a process of extracting the feature information from each MPU, according to an embodiment.

In operation 410, the server 104 may cluster the MPUs into categories, according to types of the multimedia content.

Also, in operation 420, the server 104 may extract the feature information based on each category of the clustered MPUs.

Here, types of the multimedia content may include images, sounds, or videos.

For example, the MPUs may be clustered based on when the multimedia content included in the MPUs is images.

Also, the MPUs may be clustered according to TV station captions included in the images of the MPUs. Thus, multimedia content of other TV stations may be clustered into other categories, and information regarding a TV station broadcasting the MPUs may be extracted as the feature information.

Also, the MPUs may be clustered based on when the multimedia content included in the MPUs is sound.

For example, the MPUs may be clustered into names of other people included in audio of the MPUs. Thus, multimedia content corresponding to other people may be clustered into other categories, and the names of the people which are included in the MPUs may be extracted as the feature information.

Also, the MPUs may be clustered based on when the multimedia content included in the MPUs is video.

For example, the server 104 may indirectly determine categories according to subtitle information of the MPUs in order to cluster the MPUs included in other multimedia content into other categories, and may extract feature information corresponding to the categories. Thus, the MPUs including other types of content may be clustered into other categories.

Then, in operation 430, the server 104 may generate a table showing a relationship between the feature information and the MPUs.

In this case, the MPUs and the feature information may have a many-to-many relationship. In other words, one MPU may have multiple pieces of the feature information, and the MPUs may have the same feature information.

Figure 5:
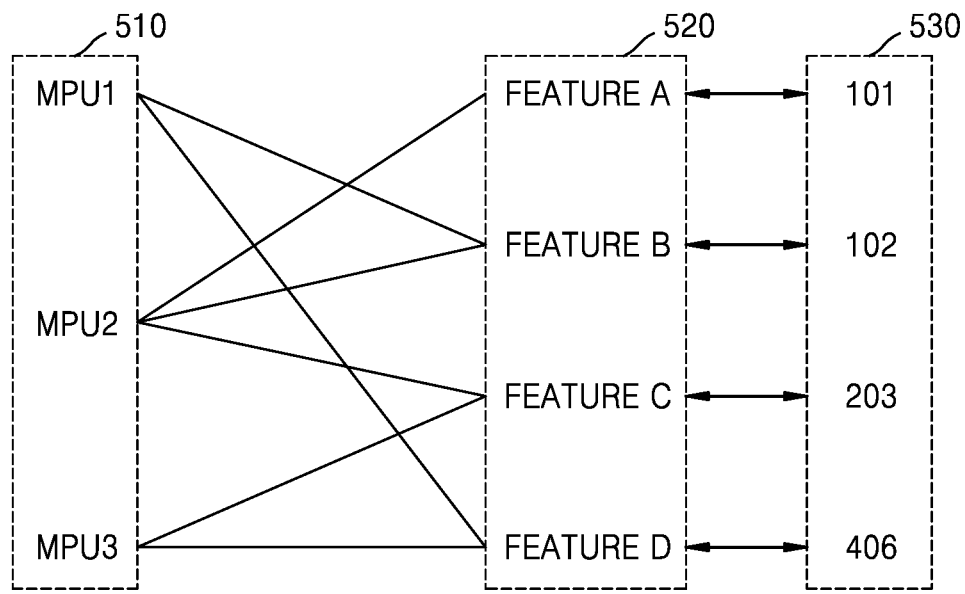
FIG. 5 is a diagram for explaining a mapping relationship between feature information and MPUs, according to an embodiment.

FIG. 5 is a diagram for explaining a mapping relationship between feature information 520 and MPUs 510, according to an embodiment.

The MPUs 510 of FIG. 5 includes MPU1, MPU2, and MPU3. The feature information 520 includes feature A, feature B, feature C, and feature D. In the MPUs 510, MPU1 has feature B and feature D, MPU2 has feature A, feature B, and feature C, and MPU3 has feature C and feature D. After the MPUs 510 are mapped to the feature information 520, the feature information corresponding to the MPUs 510 and MPUs of certain feature information may be obtained according to the mapping relationship.

In this case, in order to represent the feature information, a unique feature value may be assigned to each piece of the feature information (e.g., 530 of FIG. 5). Referring to FIG. 5, feature A is in one-to-one correspondence with a feature value 101, feature B is in one-to-one correspondence with a feature value 102, feature C is in one-to-one correspondence with a feature value 203, and feature D is in one-to-one correspondence with a feature value 406. One unique feature value is assigned to each piece of the feature information so as to broadcast the feature information to the first client in a form of numerical values.

Figure 6:
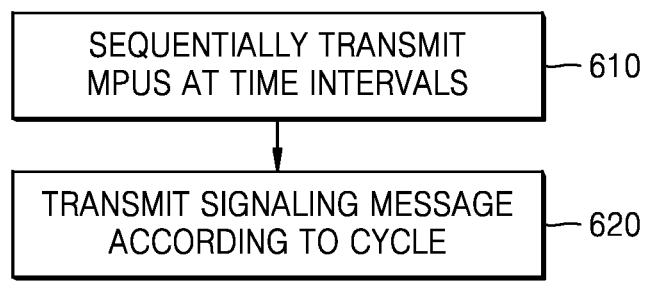
FIG. 6 is a diagram for explaining an operation in which MPUs and feature information of MPUs are broadcast to a client, according to an embodiment.

FIG. 6 is a flowchart of an example of operation 330.

In operation 610, the server 104 may sequentially transmit MPUs to the first client according to time intervals.

In operation 620, the server 104 may transmit a signaling message according to a cycle, and in this case, the signaling message may include the feature information of the MPUs transmitted in the cycle, and the table showing the relationship between the feature information and the MPUs.

In this case, "a time interval when the MPUs are transmitted" may be the same as or different from "a cycle in which the signaling message is transmitted".

For example, when "a time interval when the MPUs are transmitted" is the same as "a cycle in which the signaling message is transmitted", the server 104 may broadcast, to the first client, the feature information and the MPUs in a signal-data form such as 'feature A, MPU1; feature B, MPU2'. In this case, feature A may be feature information corresponding to MPU1, and feature B may be feature information corresponding to MPU2.

Also, "a time interval when the MPUs are transmitted" is different from "a cycle in which the signaling message is transmitted", the server 104 may broadcast, to the first client, the feature information and the MPUs in a signal-data form such as 'feature C, MPU1, MPU2; feature D, MPU3, MPU4'. In this case, feature C may be feature information corresponding to MPU1 and MPU2, and feature D may be feature information corresponding to MPU3 and MPU4.

Also, operation 620 may be performed as follows.

First of all, a first MPU may be determined to be transmitted in a cycle for a signaling message. Here, the first MPU may be an MPU transmitted in the cycle for the signaling message.

Then, feature information of the first MPU may be searched for based on the table showing the relationship between the feature information and the MPUs. For example, the pieces of the feature information of the MPUs transmitted in the cycle for the signaling message may be respectively searched for, according to the table of FIG. 5.

Lastly, feature information of the first MPU and a table showing a relationship between the first MPU and the feature information thereof are added to the signaling message. While the signaling message is broadcast to the first client after the feature information and the table are added to the signaling message, the feature information and the table are broadcast.

The MMT protocol may be used to transmit the MPU and the feature information of the MPU.

Figure 7A:
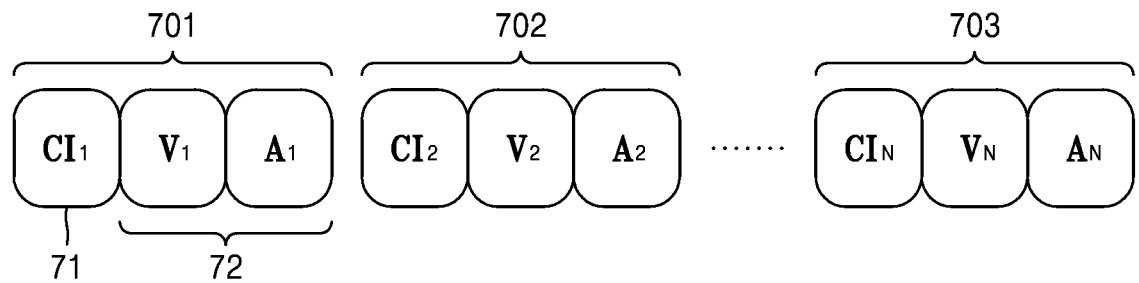
FIG. 7A is a diagram for explaining a broadcast mode of an MPU in an existing media transport (MMT) protocol.

FIG. 7A is a diagram for explaining a broadcast mode of the MPU in the MMT protocol.

In the MMT protocol, the MPUs may be transmitted in a mode illustrated in FIG. 7A, and CI may be transmitted in a signaling message mode. In each packet transmission cycle (701, 702, and 703 of FIG. 7A each are a packet transmission cycle), transmission is performed in a CI-MPU sequence. For example, in the packet transmission cycle 701, $CI_1$ 71 is transmitted prior to a corresponding MPU 72. Here, the MPU 72 includes video data $V_1$ and audio data $A_1$.

However, a current MMT protocol does not support transmission of the feature information of the MPU. In other words, in each packet transmission mode, content of the CI is identical at all times. In order to transmit feature information corresponding to the MPU compatible with frameworks of the MMT protocol, a CI format may be modified by adding a sub-entry for the feature information corresponding to the MPU to the CI.

For example, the following information may be added to the CI.

feature: reference
<reference>
<feature1/>
<feature2/>
. . .
<featureN/>
<reference/>

Here, feature 1 to feature N indicate the feature information corresponding to the MPUs.

Figure 7B:
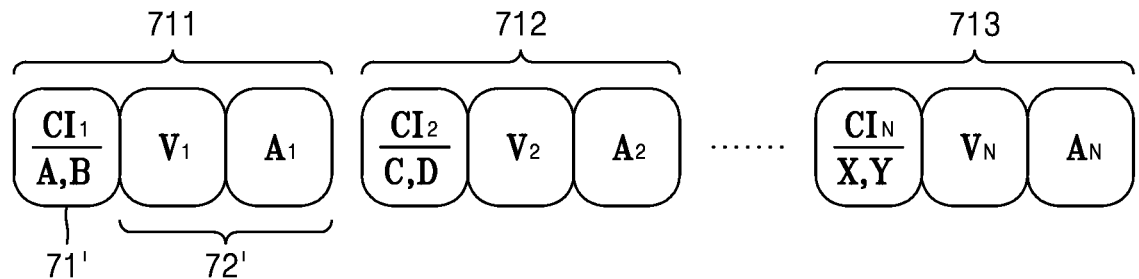
FIG. 7B is a diagram for explaining broadcasting of an MPU and feature information of the MPU after an existing MMT protocol is amended, according to an embodiment.

FIG. 7B is a diagram for explaining a broadcast mode of an MPU and feature information after an existing MMT protocol is modified, according to an embodiment.

Modified CI includes the feature information of the MPU in the packet transmission cycle.

For example, according to a packet transmission cycle 711, $CI_1$ 71' in the cycle 711 includes feature information A and feature information B of the MPU in the cycle 711.

Referring to FIG. 3, the method in which the server 104 transmits the multimedia content may further include the following operations.

In operation 340, the server 104 may receive the request information of the multimedia content that the first client selects to share with the second client. In this case, the request information includes specification information of the MPUs into which requested multimedia content is split.

Here, the specification information is used to describe information of the MPUs included in requested parts of the multimedia content.

Also, the specification information may be described as information regarding locations of the MPUs, in the requested multimedia content. Here, the word "location" is construed as having a broader meaning than just a spatial location. In addition, the specification information may be used to accurately describe the MPUs included in the requested multimedia content. For example, the specification information may include time, space coordinates, elements, and additional information relevant to the multimedia content.

In this case, the elements of the multimedia content may include video information, audio information, or subtitle information, and the additional information relevant to the multimedia content may include information regarding text for describing the multimedia content or an application for executing the multimedia content.

Figure 8:
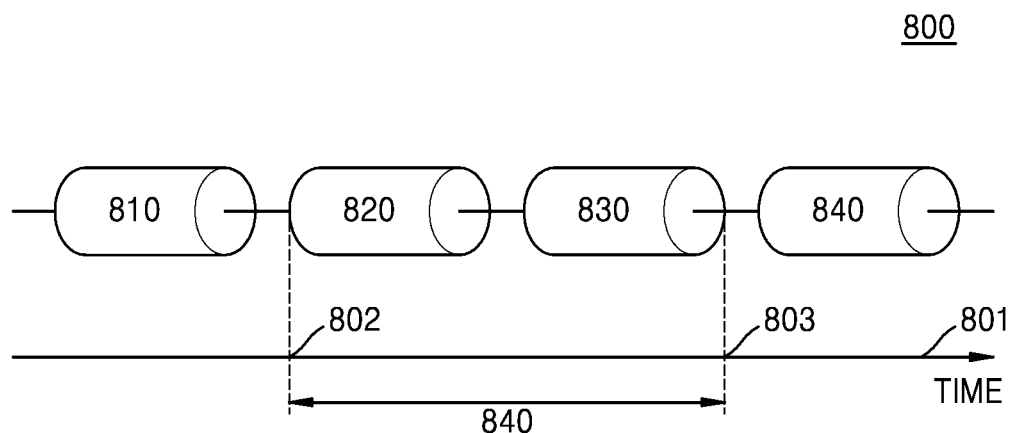
FIG. 8 is a diagram for explaining an MPU corresponding to specification information when the specification information includes time information, according to an embodiment.

FIG. 8 is a diagram for explaining an MPU 800 corresponding to specification information when the specification information includes time information, according to an embodiment.

Referring to FIG. 8, the multimedia content may be split into an MPU 810, an MPU 820, an MPU 830, and an MPU 840 in sequence. In this case, when it is assumed that the requested multimedia content is the MPU 820 and the MPU 830, the request information may include the specification information used to describe time information of the MPU 820 and the MPU 830.

For example, the specification information may include a start point in time 802 of the MPU 820 and an end point in time 803 of the MPU 830.

In particular, when broadcast request information is transmitted compatibly with the frameworks of the MMT protocol, information used to describe the start point in time 802 of the MPU 820 and the end point in time 803 of the MPU 830 may be added to the CI by adding a specification phrase "sequence number:start_time-end_time" to the information.

Also, the specification information may include the start point in time 802 of the MPU 820 and duration 840 of the MPU 820 and the MPU 830. When the broadcast request information is transmitted compatibly with the frameworks of the MMT protocol, the following phrase may be added to the CI.

sequence_number:start_time-duration.

In addition, the specification information may include the duration 840 of the MPU 820 and the MPU 830 and the end point in time 803 of the MPU 830. When the broadcast request information is transmitted compatibly with the frameworks of the MMT protocol, the following phrase may be added to the CI.

sequence_number: duration-end_time

Figure 9:
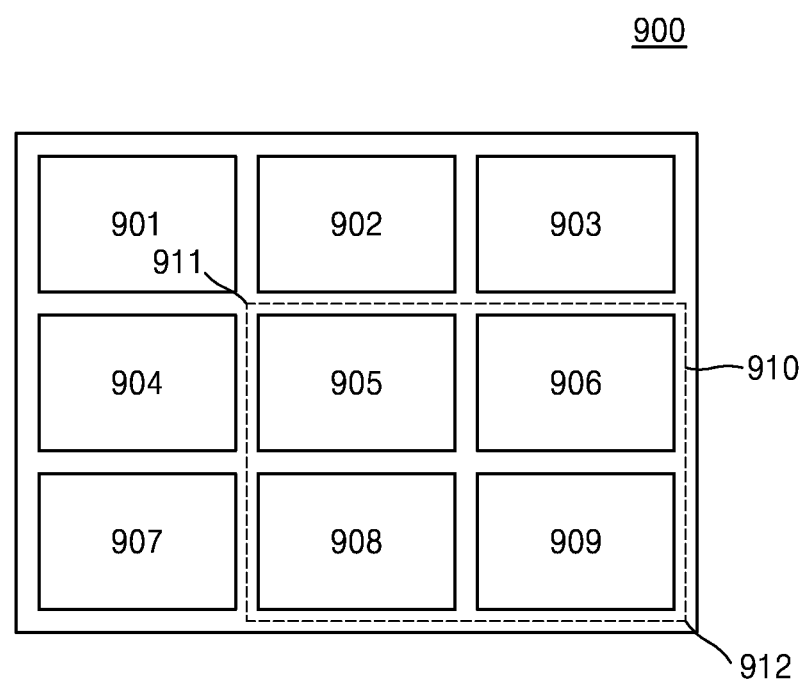
FIG. 9 is a diagram for explaining an MPU corresponding to specification information when the specification information includes space coordinates, according to an embodiment.

FIG. 9 is a diagram for explaining an MPU 900 corresponding to the specification information when the specification information includes space coordinates, according to an embodiment.

Referring to FIG. 9, the multimedia content may be split into an MPU 901 to an MPU 909 according to the space coordinates in a horizontal direction and a downward direction. In this case, when it is assumed that requested multimedia content corresponds to MPUs 905 to 909 within a box 910 indicated by a dashed line, the specification information may include a start coordinate value 911 of the MPU 905 at an top left corner of the box 910, and an end coordinate value 912 of the MPU 909 at a bottom right corner of the box 910.

In particular, when the broadcast request information is transmitted compatibly with the frameworks of the MMT protocol, information used to describe the start coordinate value 911 of the MPU 905 and the end coordinate value 912 of the MPU 909 may be added to the CI. For example, the following phrase may be added.

solid axes:start_point-end_point or solid axes: (x1, y1)-(x2, y2).

Where, x1 and y1 are an x coordinate value and a y coordinate value of a start point of the MPU 905, and x2 and y2 are an x coordinate value and a y coordinate value of an end point of the MPU 909.

Figure 10:
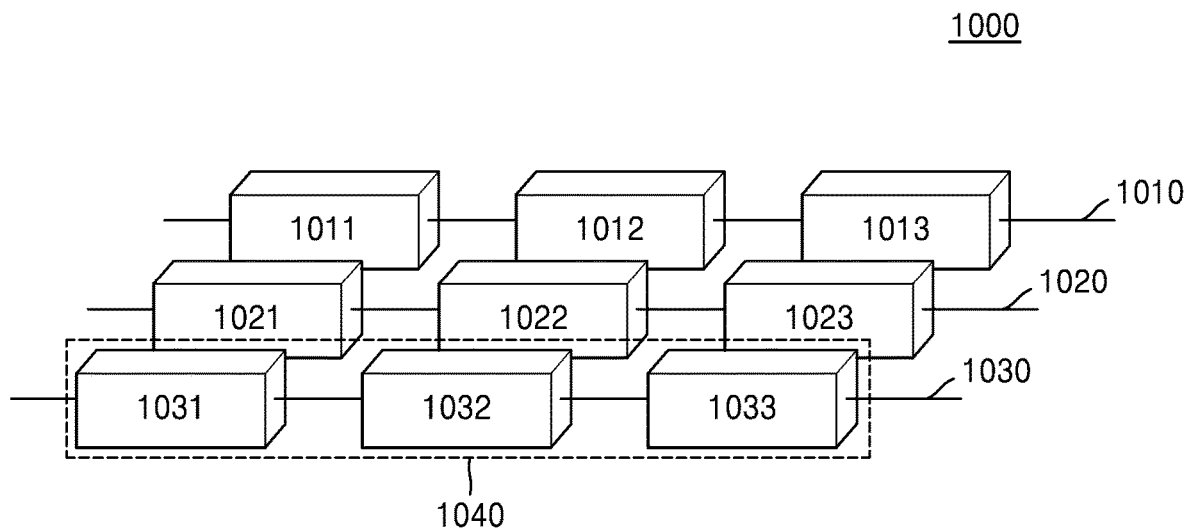
FIG. 10 is diagram for explaining an MPU corresponding to specification information when the specification information includes information regarding elements, according to an embodiment.

FIG. 10 is a diagram for explaining an MPU 1000 corresponding to the specification information when the specification information includes information regarding the elements, according to an embodiment.

Referring to FIG. 10, the multimedia content may be split into a first orbit 1010, a second orbit 1020, and a third orbit 1030, according to different elements. In this case, the first orbit 1010 may include MPUs 1011 to 1013; the second orbit 1020 may include MPUs 1021 to 1023; and the third orbit 1030 may include MPUs 1031 to 1033. In this case, when it is assumed that the requested multimedia content corresponds to the MPUs 1031 to 1033 within a box 1040 indicated by a dashed line, the specification information may include the information regarding the elements of the MPUs 1031 to 1033.

In particular, when the broadcast request information is transmitted compatibly with the frameworks of the MMT protocol, information used to describe the elements of the MPUs 1031 to 1033 may be added to the CI. For example, the following phrase may be added to the CI.

media_element: track.

Similarly, when requested content is additional information (an additional document and/or an additional application) corresponding to certain multimedia content, the additional information may be added to the specification information.

In particular, when the broadcast request information is transmitted compatibly with the frameworks of the MMT protocol, information used to describe the additional information may be added to the CI. For example, the following phrase may be added.

attachment_info: file

Moreover, when the requested content needs to be described based on at least one of time, space coordinates, elements, and additional information relevant to the multimedia content, content including the time, the space coordinates, the elements, and the additional information relevant to the multimedia content may be included in the specification information in order to accurately describe the requested content.

Furthermore, the broadcast request information may include the feature information of the MPUs included in the requested multimedia content. In this case, the method according to an embodiment includes the following operations.

In operation 350, the server 104 may search for multimedia content relevant to the requested multimedia content, based on the feature information included in the request information.

Also, in operation 370, the server 104 may push the relevant multimedia content to the second client.

The request information may include the feature information of the MPUs into which the requested multimedia content is split. Thus, based on the request information, the server 104 may search for other multimedia content in which other MPUs having the same feature information are combined. Also, found multimedia content may be provided to the second client that receives the request information.

In addition, multimedia content, in which the requested multimedia content is combined with MPUs having the same feature information as some MPUs, is determined as the relevant multimedia content, and the relevant multimedia content may be provided to the second client.

For example, the MPU of the requested multimedia content includes four pieces of the feature information, i.e., A, B, C, and D. In this case, the server 104 may determine multimedia content including three of the four pieces of the feature information as relevant multimedia content.

Also, the request information may include the address of the first client. In this case, the method according to an embodiment may include the following operations.

In operation 380, the server 104 may push the relevant multimedia content to the first client.

In this case, the address of the first client may include an IP address of the first client, information regarding a port performing a sharing operation in the first client, e.g., on-demand monitoring port information.

Since the address of the first client is included in the request information, the relevant multimedia content, which is retrieved by the server 104 in operation 360, may be provided to the first client.

Figure 11:
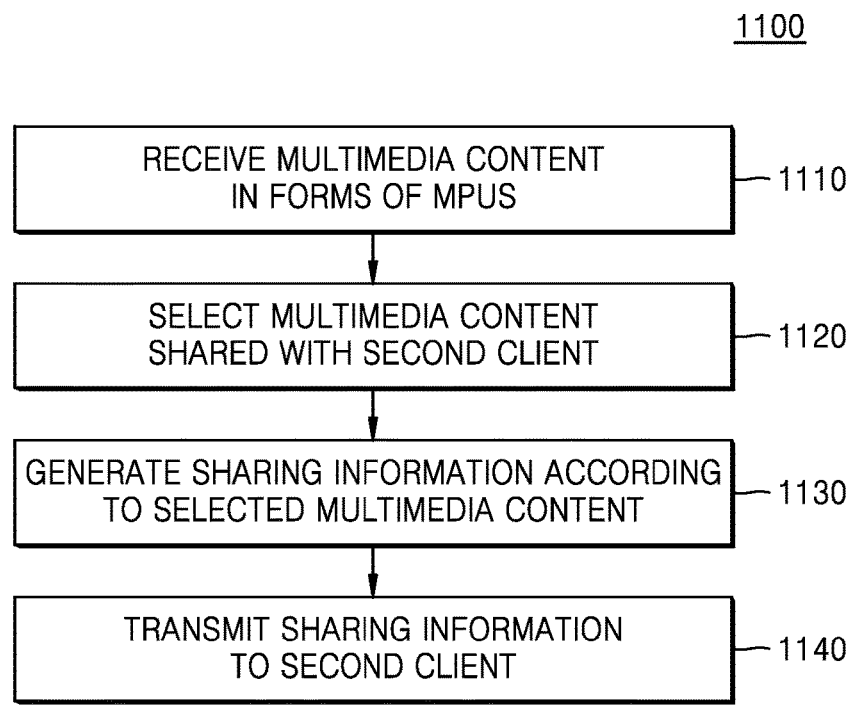
FIG. 11 is a flowchart of a method in which a first client shares multimedia content, according to an embodiment.

FIG. 11 is a flowchart of a method in which the first client shares the multimedia content, according to an embodiment.

In operation 1110, the first client may receive the multimedia content in an MPU form. In this case, the first client may receive the MPUs and the feature information corresponding to the MPUs.

In addition, the first client may receive the multimedia content from the server 104.

In operation 1120, the first client may select, from among the pieces of the received multimedia content, some pieces of the multimedia content to share with the second client.

In this case, the first client may select the multimedia content to be shared with the second client, by receiving from a user a signal through one of a remote control, a touch screen, a microphone, a camera, and an ultrasonic gesture sensor.

Also, the MPU of the multimedia content shared with the second client may be selected based on one of the time, the space coordinates, the elements, and the additional information, relevant to the multimedia content. In this case, the additional information may include information regarding text for describing the multimedia content or an application for executing the multimedia content.

In operation 1130, the first client may generate sharing information according to the selected multimedia content. In this case, the sharing information may include the specification information and feature information of the MPUs included in the multimedia content selected to be shared with the second client.

In operation 1140, the first client may transmit the sharing information to the second client.

In this case, the first client may transmit the sharing information to the second client and may not specify a destination to which the sharing information is transmitted. For example, the first client may transmit the sharing information to a sharing platform such as a microblog or WeChat's circle of friends.

In other examples, operation 1110 may include an operation of sequentially receiving the MPUs according to predefined time intervals and an operation of receiving the signaling message according to a predefined cycle. The signaling message may include the feature information of the MPUs transmitted in the cycle for the signaling message, and the table showing the relationship between the MPUs and the feature information thereof.

In other examples, operation 1130 may include: an operation of generating specification information according to a selected MPU; an operation of searching for the feature information of the MPUs from the multimedia content selected to be shared, based on the table showing the relationship between the MPUs and the feature information thereof; and an operation of including the specification information and the feature information in the sharing information.

In other examples, operation 1130 may further include an operation of adding the address of the first client to the sharing information.

For example, when the sharing information is transmitted compatibly with the frameworks of the MMT protocol, features of a transmission address may be added to the CI. For example, "share_src=IPport" may be added to the CI. In this case, the IP may be the IP address of the first client, and the port may denote information of a port through which the first client transmits the sharing information.

Figure 12:
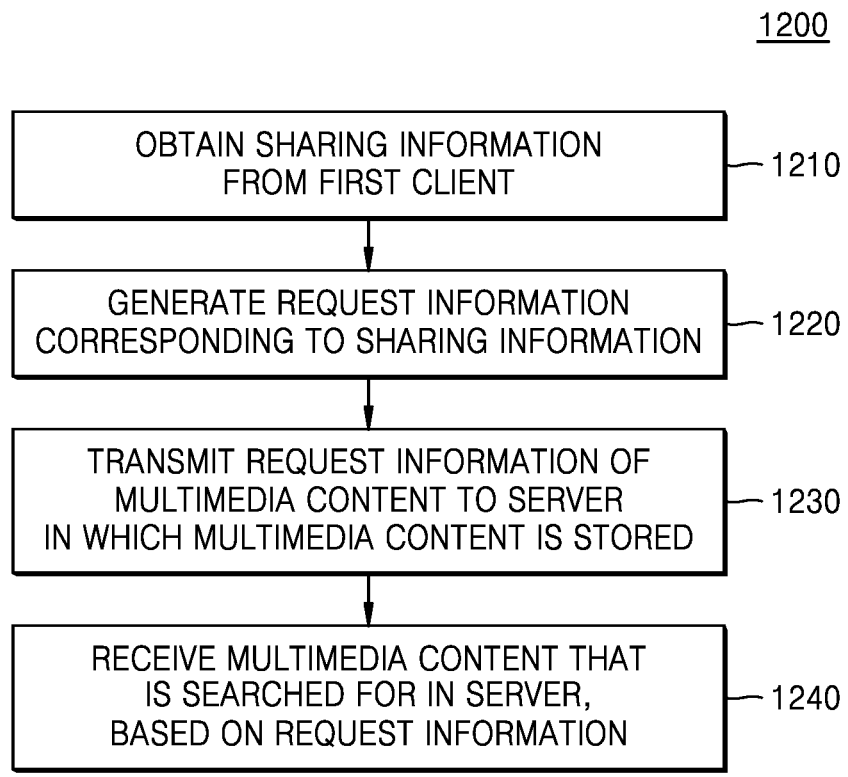
FIG. 12 is a flowchart of a method in which a second client obtains multimedia content, according to an embodiment.

FIG. 12 is a flowchart of a method in which the second client obtains the multimedia content, according to an embodiment.

In operation 1210, the second client may obtain the sharing information from the first client. In this case, the sharing information may include the specification information and the feature information of the MPUs into which the multimedia content is split.

In operation 1220, the second client may generate the request information corresponding to the sharing information. In this case, the request information may include the specification information.

In operation 1230, the second client may transmit the request information of the multimedia content to the server 104 in which the multimedia content is stored.

In operation 1240, the second client may receive the multimedia content from the server 104 based on the request information.

In this case, operation 1220 may further include an operation in which the second client adds the address of the first client to the request information.

Also, the second client may further add the feature information to the request information. In this case, the second client may further perform an operation of receiving, from the server 104, multimedia content relevant to the multimedia content that the first client selects to share with the second client. In this regard, the relevant multimedia content may be multimedia content recommended by the server 104 based on the feature information.

Figure 13:
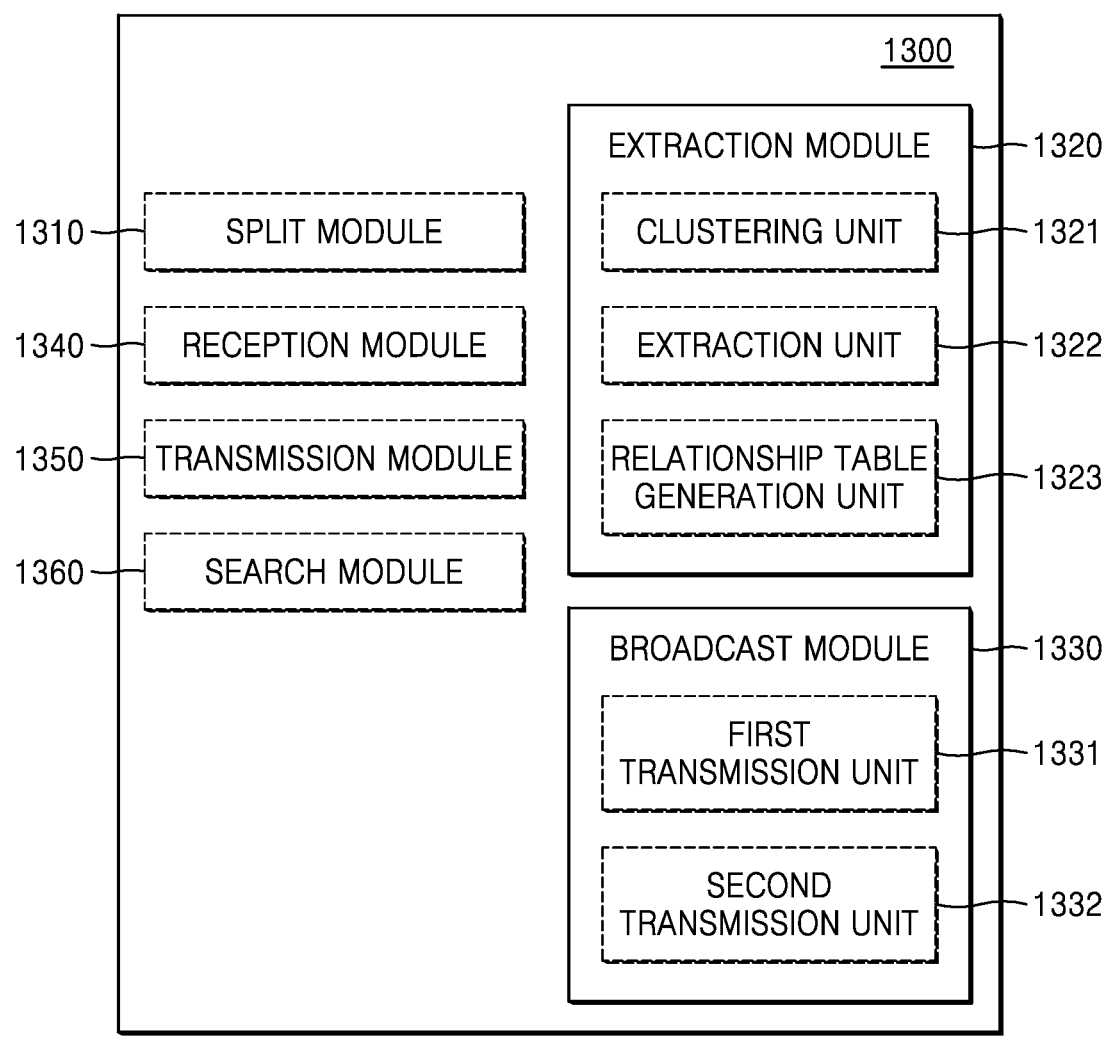
FIG. 13 is a block diagram for explaining a structure of a server, according to an embodiment.

FIG. 13 is a block diagram for explaining a structure of the server 1300, according to an embodiment.

Referring to FIG. 13, the server 1300 may include a split module 1310, an extraction module 1320, and a broadcast module 1330.

The split module 1310 may split multimedia content into MPUs. The extraction module 1320 may extract feature information from each MPU. The broadcast module 1330 may broadcast the MPUs and the feature information of the MPUs to a client.

In this case, the extraction module 1320 may include a clustering unit 1321, an extraction unit 1322, and a relationship table generation unit 1323.

In this case, the clustering unit 1321 may cluster the MPUs into categories, based on features of the multimedia content. The extraction unit 1322 may extract the feature information from each of the clustered categories. The relationship table generation unit 1323 may generate a table showing a relationship between the feature information and the MPUs.

In this case, the feature of the multimedia content may include an image feature, a sound feature, or a content feature.

The broadcast module 1330 may include a first transmission unit 1331 and a second transmission unit 1332.

In this case, the first transmission unit 1331 may sequentially transmit the MPUs to the first client according to time intervals. The second transmission unit 1332 may transmit a signaling message according to a cycle. For example, the signaling message may include feature information of MPUs, which are transmitted in a cycle in which the signaling message is transmitted, and the table showing the relationship between the feature information and the MPUs.

Moreover, the second transmission unit 1332 may determine a first MPU transmitted in the cycle in which the signaling message is transmitted; search for feature information of the first MPU based on a mapping relationship between the feature information and the MPUs; and add the feature information of the first MPU and a table showing a relationship between the first MPU and the feature information of the first MPU to the signaling message.

The server 1300 may further include a reception module 1340 and a transmission module 1350.

In this case, the reception module 1340 may receive broadcast request information from the client. The broadcast request information may include specification information of the MPUs included in the multimedia content. Based on the specification information, the transmission module 1350 may transmit requested multimedia content to the client that transmits the broadcast request information.

In this case, the specification information may include time, space coordinates, elements, or additional information, relevant to the multimedia content.

In this case, the additional information may include information regarding text for describing the multimedia content, or an application for executing the multimedia content.

Also, the broadcast request information may further include the feature information of the MPUs into which the requested multimedia content is split.

The server 1300 may further include a search module 1360. The search module 1360 may search for multimedia content relevant to the requested multimedia content, based on the feature information.

In addition, the transmission module 1350 may push the relevant multimedia content to the client that transmits the broadcast request information.

Also, the broadcast request information may further include an address of the first client that desires to share the multimedia content with the second client.

Moreover, the transmission module 1350 may push, to the first client, the relevant multimedia content based on the address of the first client which is included in the broadcast request information.

Figure 14:
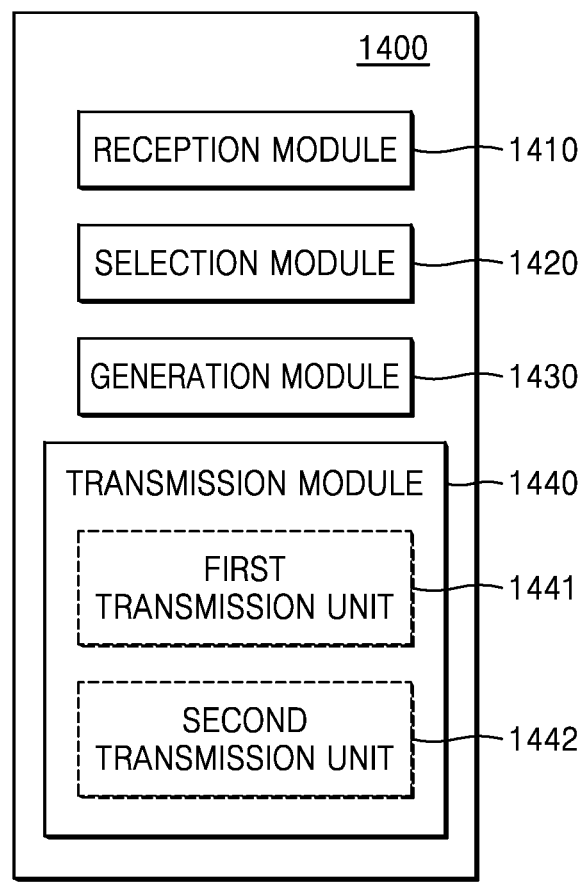
FIG. 14 is a block diagram of a structure of a first client for sharing multimedia content with a second client, according to an embodiment.

FIG. 14 is a block diagram of a structure of a first client 1400 sharing multimedia content with a second client, according to an embodiment.

Referring to FIG. 14, the first client 1400 may include a reception module 1410, a selection module 1420, a generation module 1430, and a transmission module 1440.

In this case, the reception module 1410 may receive the multimedia content from the server 104. The reception module 1410 may receive the multimedia content in forms of the MPUs and feature information corresponding to each MPU. The selection module 1420 may select, from among all pieces of the multimedia content, some pieces of the multimedia content to be shared with the second client. The generation module 1430 may generate sharing information regarding the multimedia content that is selected to be shared with the second client. The sharing information includes the specification information and the feature information of the MPUs into which the multimedia content is split. The transmission module 1440 may transmit the sharing information.

In some examples, the reception module 1410 may sequentially receive the MPUs from the server 104 according to the time intervals, and may receive the signaling message according to the cycle. In this case, the signaling message includes the feature information of the MPUs, which are transmitted in the cycle for the signaling message, and the table showing the relationship between the feature information and the MPUs.

The generation module 1430 may generate the specification information regarding the multimedia content to be shared; search for the feature information of the MPUs from the multimedia content to be shared, based on the table showing the relationship between the feature information and the MPUs; and add the specification information and the feature information to the sharing information.

Also, the generation module 1430 may add the address of the first client to the sharing information.

The selection module 1420 may select an MPU based on the time, the space coordinates, the elements, or the additional information related to a multimedia document. In this case, the additional information may include the information regarding the text for describing the multimedia content or the application for executing the multimedia content.

In addition, the transmission module 1440 may include a first transmission unit 1441 and a second transmission unit 1442.

The first transmission unit 1441 may transmit the sharing information to the second client, and the second transmission unit 1442 may transmit the sharing information to a sharing platform.

Figure 15:
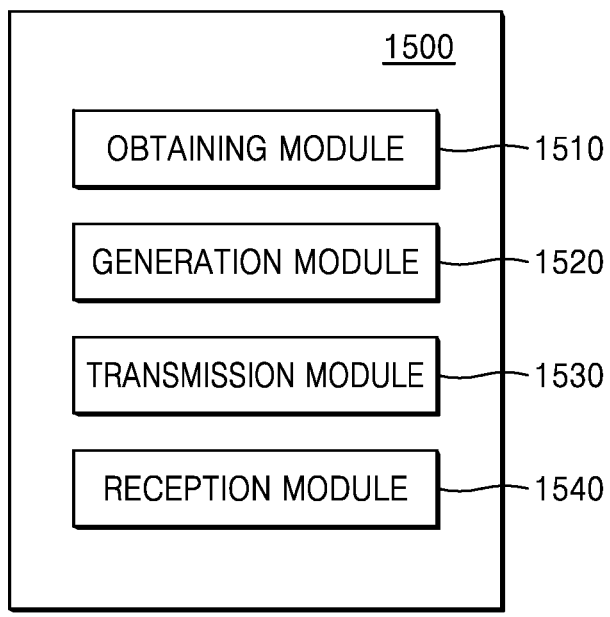
FIG. 15 is a block diagram of a structure of a second client for obtaining multimedia content, according to an embodiment.

FIG. 15 is a block diagram of a structure of a second client 1500 for obtaining multimedia content, according to an embodiment.

Referring to FIG. 15, the second client 1500 may include an obtaining module 1510, a generation module 1520, a transmission module 1530, and a reception module 1540.

In this case, the obtaining module 1510 may obtain the sharing information from the first client. The sharing information includes the specification information and the feature information of the MPUs in the shared multimedia content. The generation module 1520 may generate the request information according to the sharing information. In this case, the request information may include the specification information. The transmission module 1530 may transmit the request information to the server 104. The reception module 1540 may receive the multimedia content from the server 104.

The generation module 1520 may add the address of the first client to the request information.

Also, the reception module 1540 may receive the relevant multimedia content. The relevant multimedia content may be multimedia content that is relevant to the shared multimedia content and is recommended by the server 104 based on the feature information.

Figure 16:
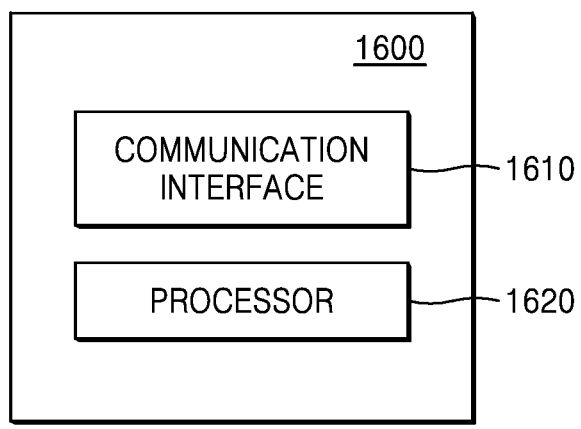
FIG. 16 is a block diagram of structures of a first client and a second client according to another embodiment.

FIG. 16 is a block diagram of structures of a first client and a second client according to another embodiment.

Referring to FIG. 16, the first client and the second client may each include a communication interface 1610 and a processor 1620.

The communication interface 1610 of the first client may select at least one piece of the multimedia content to share with the second client from among the pieces of the multimedia content received from the server 104, and may transmit, to the second client, the sharing information including information regarding the selected piece of the multimedia content.

The processor 1620 of the first client may generate the sharing information of the multimedia content after receiving the multimedia content from the server 104.

The communication interface 1610 of the second client may receive, from the first client, the sharing information including information regarding the at least one piece of the multimedia content which is selected to be shared with the second client from among the pieces of the multimedia content that the first client receives from the server 104; may transmit the request information of the multimedia content generated based on the sharing information, to the server 104 in which the multimedia content is stored; and may receive the multimedia content that is retrieved by the server 104 based on the request information. Also, the communication interface 1610 of the second client may receive, from the first client, the table showing the relationship between the feature information and the MPUs generated by the server 104.

In addition, the communication interface 1610 of the second client may receive the multimedia content that is determined by the server 104 as being related to the multimedia content. In this case, when there are multiple pieces of the feature information, the relevant multimedia content may indicate multimedia content having the same feature information as some of the pieces of the multimedia content.

When the communication interface 1610 of the second client receives the sharing information, the processor 1620 of the second client may generate the request information of the multimedia content which is to be transmitted to the server 104.

In this case, the sharing information may include information regarding the address of the first client, and the processor 1620 of the second client may generate request information including the information regarding the address of the first client.

Figure 17:
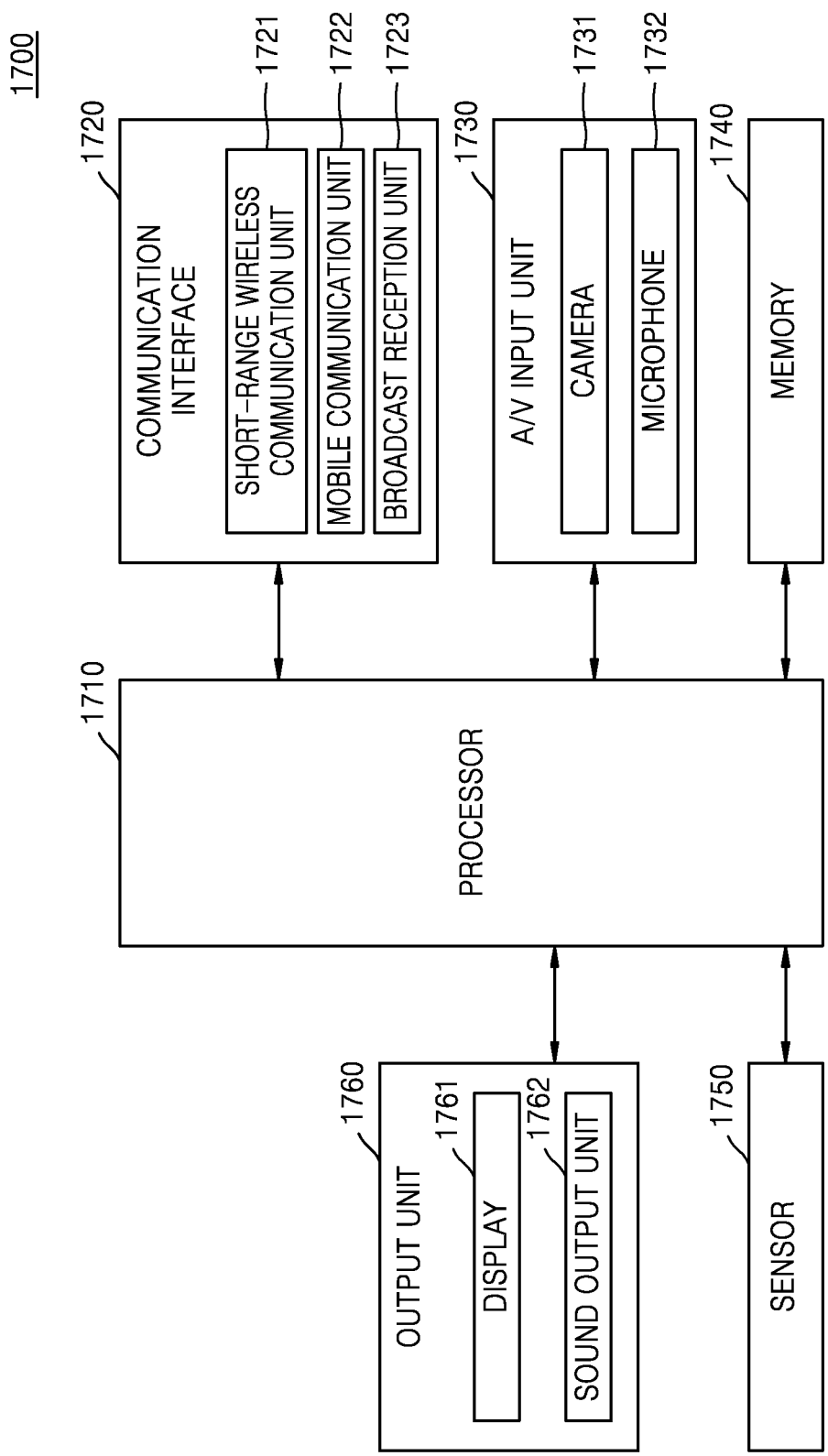
FIG. 17 is a detailed block diagram of structures of a first client and a second client, according to an embodiment.

FIG. 17 is a detailed block diagram of the structures of the first client and the second client 1700, according to an embodiment.

Referring to FIG. 17, the first client and the second client 1700 may each include an audio/video (A/V) input unit 1730, a memory 1740, a sensing unit 1750, and an output unit 1760, in addition to a processor 1710 and a communication interface 1720.

The processor 1710 corresponds to the processor 1620 of FIG. 16, and thus detailed descriptions thereof will be omitted.

The communication interface 1720 may include a short-range wireless communication unit 1721, a mobile communication unit 1722, and a broadcast reception unit 1723.

The short-range wireless communication unit 1721 may include, but is not limited to, a Bluetooth communication unit, a Bluetooth Low Energy (BLE) communication unit, a Near Field Communication (NFC) unit, a WLAN communication unit, a Zigbee communication unit, an Infrared Data Association (IrDA) communication unit, a Wi-Fi Direct (WFD) communication unit, an Ultra Wideband (UWB) communication unit, an Ant+ communication unit, and the like.

The mobile communication unit 1722 may receive/transmit a wireless signal from/to at least one of a broadcast station, an external terminal, and a server via a mobile communication network. Here, the wireless signal may include various types of data according to reception/transmission of a voice call signal, a video-phone call signal, or a text message/multimedia message.

The broadcast reception unit 1723 receives broadcast signals and/or information regarding broadcasts from the outside through a broadcast channel. The broadcast channel may include a satellite channel and a terrestrial channel.

The A/V input unit 1730 may receive an audio signal or a video signal and may include a camera, a microphone, and the like.

The memory 1740 may store programs for processing and controlling the processor 1710 and data input to or output from the first client and the second client 1700.

The sensing unit 1750 may detect states of or states around the first client and the second client 1700 and may deliver the detected states to the processor 1710. The sensing unit 1750 may include, but is not limited to, at least one of a magnetic sensor, an acceleration sensor, a temperature/humidity sensor, an infrared sensor, a gyroscope sensor, a position sensor (e.g., a global positioning system (GPS)), an air pressure sensor, a proximity sensor, and an RGB sensor (an illuminance sensor).

The output unit 1760 may output an audio signal or a video signal and may include a display 1761 and a sound output unit 1762.

Figure 18:
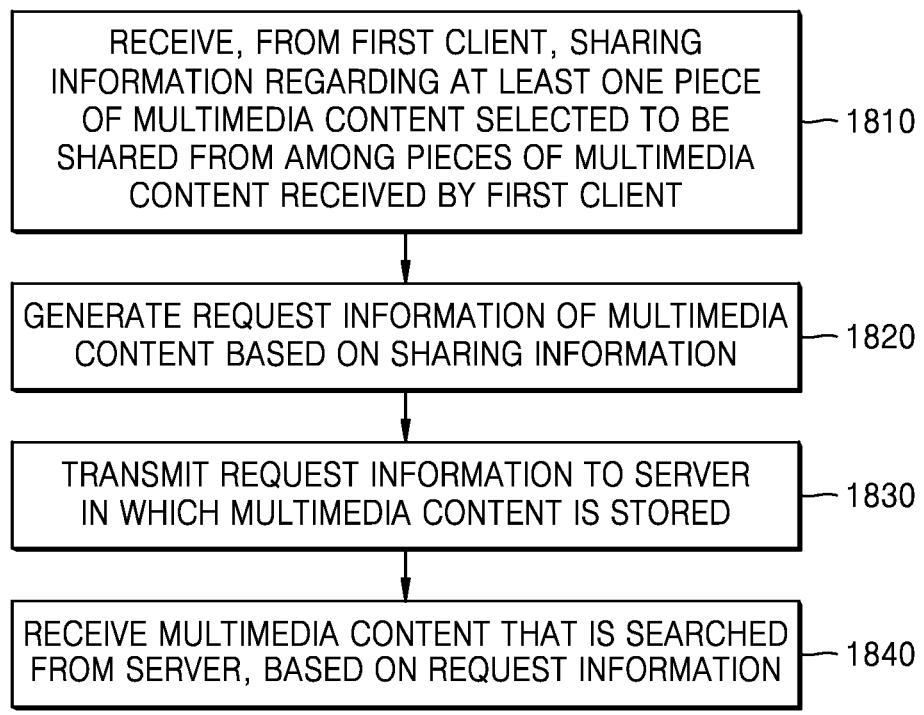
FIG. 18 is a diagram for explaining a method in which a second client receives multimedia content provided by a server to a first client, according to an embodiment.

FIG. 18 is a diagram for explaining a method in which a second client receives multimedia content provided by a server to a first client, according to an embodiment.

In operation 1810, the second client may receive, from the first client, sharing information regarding at least one piece of the multimedia content, which is selected for sharing from among the pieces of the multimedia content received from the first client. In this case, the first client may select some pieces of the multimedia content for sharing while receiving the multimedia content in a streaming manner. Also, the first client may select some pieces of the multimedia content being broadcast from the server, thus sharing the selected pieces of the multimedia content with the second client.

The multimedia content may be split into the MPUs by the server 104, and the feature information may be generated based on the clustering of the MPUs according to a type of the multimedia content. The type of the multimedia content may include an image, text, a sound, or a video.

Also, the second client may receive, from the first client, a table showing a relationship between the MPUs and the feature information generated by the server 104.

In addition, the request information may include the feature information. The second client may receive the multimedia content that is determined by the server 104 as being relevant to the multimedia content. In this case, when there are multiple pieces of the feature information, the relevant multimedia content may indicate multimedia content having the same feature information as some of the pieces of the feature information.

The sharing information may include section information that specify some pieces of the multimedia content, or information regarding a location where the multimedia content is stored.

Also, the request information may include the specification information of the multimedia content, and the specification information may include elements, which are defined as types of content forming a time, space coordinates, and the multimedia content, or additional information regarding the multimedia content. In this case, the elements may include video information, audio information, or subtitle information, and the additional information relevant to the multimedia content may include text for describing the multimedia content, or information regarding an application for executing the multimedia content.

Moreover, when the multimedia content is broadcast according to the MMT protocol, the feature information may be included in the CI in the signaling message and may be broadcast.

In operation 1820, the second client may generate the request information of the multimedia content based on the sharing information.

In this case, the sharing information may include address information of the first client, and the generation of the request information may be generation of the request information including the address information of the first client.

In operation 1830, the second client may transmit the request information to the server 104 in which the multimedia content is stored.

In operation 1840, the second client may receive the multimedia content searched for by the server 104, based on the request information. The embodiments of the present disclosure can be written as computer programs and can be implemented in general-use digital computers that execute the programs using a non-transitory computer-readable recording medium. Data structures in the above embodiments can be recorded to a non-transitory computer-readable recording medium in various manners. The embodiments of the present disclosure can be implemented as a non-transitory computer-readable recording medium including instructions executable by a computer such as a program module executed by a computer. For example, when software modules or algorithms are involved, these software modules may be stored as program instructions or computer-readable codes executable on a processor on a non-transitory computer-readable medium.

A non-transitory computer-readable medium may be an arbitrary recording medium accessible by a computer and may include a volatile medium and a non-volatile medium, a removable medium, and a non-removable medium. Examples of the non-transitory computer-readable recording medium include magnetic storage media (e.g., ROM, floppy disks, hard disks, etc.), optical recording media (e.g., CD-ROMs, or DVDs), etc. However, the non-transitory computer-readable recording medium is not limited thereto. Also, the non-transitory computer-readable recording medium may include a computer storage medium and a communication medium.

The non-transitory computer-readable recording medium can also be distributed over network coupled computer systems, and data (e.g., program instructions and codes) stored therein may be executed by at least one computer.

Certain embodiments described herein are merely embodiments of the present disclosure and do not limit the scope of the present disclosure. For convenience of explanation, electronic components, control systems, software, and other functional aspects of the above systems may not be described.

While the disclosure has been particularly shown and described with reference to exemplary embodiments thereof, it will be understood by those of ordinary skill in the art that various changes in form and details may be made therein without departing from the spirit and scope of the disclosure as defined by the following claims. For example, each component in a singular form may be executed in a distributed manner, and components that are distributed may be executed in a combined manner.

The invention claimed:

1. An apparatus comprising a second client, wherein the second client is configured to receive, from a server, multimedia content provided by the server to a first client, and the second client comprises:
   a communication interface configured to:
   receive a communication generated and sent from the first client, the communication having sharing information including information regarding at least one piece of the multimedia content which is selected to be shared, from among pieces of the multimedia content received by the first client;
   transmit request information of the multimedia content to the server in which the multimedia content is stored; and
   receive the multimedia content retrieved by the server based on the request information; and
   a processor configured to generate the request information of the multimedia content,
   wherein the multimedia content is provided together with feature information representing details of the multimedia content,
   the multimedia content is split by the server into media processing units (MPUs),
   the feature information is generated based on clustering of the MPUs according to a type of the multimedia content, and
   the request information is generated based on the sharing information and the feature information.

2. The apparatus of claim 1,
   the type of the multimedia content comprises an image, text, sound, or video.

3. The apparatus of claim 2, wherein the communication interface is further configured to receive, from the first client, a table showing a relationship between the feature information and the MPUs generated by the server.

4. The apparatus of claim 1, wherein the request information comprises the feature information,
   the communication interface is further configured to receive relevant multimedia content that is determined by the server as being relevant to the multimedia content, and
   when there are multiple pieces of the feature information, the relevant multimedia content is multimedia content having a same feature information as some of the pieces of the feature information.

5. The apparatus of claim 1, wherein the sharing information comprises section information used to specify part of the multimedia content or information regarding a location where the multimedia content is stored.

6. The apparatus of claim 1, wherein, when the multimedia content is broadcast according to a Moving Picture Experts Group (MPEG) media transport (MMT) protocol, the feature information is included in composition information (CI) within a signaling message and then is broadcast.

7. The apparatus of claim 1, wherein the sharing information comprises information regarding an address of the first client, and
the processor is further configured to generate request information comprising the information regarding the address of the first client.

8. An apparatus comprising a first client,
wherein the first client is configured to receive multimedia content from a server and shares the received multimedia content with a second client, and the first client comprises:
a communication interface configured to:
select at least one piece of the multimedia content to share with the second client, the at least one piece being selected from among pieces of the multimedia content received from the server; and
generate and transmit, to the second client, a communication having sharing information including information regarding the at least one piece of the multimedia content; and
a processor configured to generate sharing information of the multimedia content,
wherein the multimedia content is provided together with feature information representing details of the multimedia content,
the multimedia content is split by the server into media processing units (MPUs),
the feature information is generated based on clustering of the MPUs according to a type of the multimedia content, and
the sharing information is generated based on the feature information.

9. A method in which a second client receives, from a server, multimedia content provided by the server to a first client, the method comprising:
receiving a communication generated and sent from the first client having sharing information regarding at least one piece of the multimedia content, the at least one piece being selected to be shared from among pieces of the multimedia content received by the first client;
generating request information of the multimedia content;
transmitting the request information to a server in which the multimedia content is stored; and
receiving the multimedia content retrieved by the server based on the request information,
wherein the multimedia content is provided together with feature information representing details of the multimedia content,
the multimedia content is split by the server into media processing units (MPUs),
the feature information is generated based on clustering of the MPUs according to a type of the multimedia content, and
the request information is generated based on based on the sharing information and the feature information.

10. The method of claim 9,
the type of the multimedia content comprises an image, text, sound, or video.

11. The method of claim 10, further comprising receiving, from the first client, a table showing a relationship between the feature information and the MPUs generated by the server.

12. The method of claim 9, wherein the request information comprises the feature information,
the method further comprises receiving relevant multimedia content that is determined by the server as being relevant to the multimedia content, and
when there are multiple pieces of the feature information, the relevant multimedia content is multimedia content having a same feature information as some of the pieces of the feature information.

13. The method of claim 9, wherein the sharing information comprises section information used to specify part of the multimedia content or information regarding a location where the multimedia content is stored.

14. The method of claim 9, wherein, when the multimedia content is broadcast according to a media transport (MMT) protocol, the feature information is included in composition information (CI) within a signaling message and then is broadcast.

15. The method of claim 9, wherein the sharing information comprises information regarding an address of the first client, and
the generating of the request information comprises generating request information comprising the information regarding the address of the first client.

16. The apparatus of claim 8, wherein the multimedia content is split by the server into media processing units (MPUs),
the feature information is generated based on clustering of the MPUs according to a type of the multimedia content, and
the type of the multimedia content comprises an image, text, sound, or video.

17. The apparatus of claim 8, wherein the multimedia content is split by the server into media processing units (MPUs), and
wherein the communication interface is further configured to receive, from the second client, a table showing a relationship between the feature information and the MPUs generated by the server.

18. The apparatus of claim 8, wherein the communication interface is further configured to receive relevant multimedia content that is determined by the server as being relevant to the multimedia content, and
when there are multiple pieces of the feature information, the relevant multimedia content is multimedia content having a same feature information as some of the pieces of the feature information.

19. The apparatus of claim 8, wherein the sharing information comprises section information used to specify part of the multimedia content or information regarding a location where the multimedia content is stored.

20. The apparatus of claim 8, wherein, when the multimedia content is broadcast according to a Moving Picture Experts Group (MPEG) media transport (MMT) protocol, the feature information is included in composition information (CI) within a signaling message and then is broadcast.

* * * * *